United States Patent [19]

Mozhaev et al.

[11] 4,025,355
[45] May 24, 1977

[54] PROCESS FOR THE PREPARATION OF STARTING MIXTURE FOR MAKING CONSTRUCTION ELEMENTS

[76] Inventors: Vasily Pavlovich Mozhaev, ulitsa Shvernika, 1, korpus 4, kv. 38; Ilya Yakovlevich Leichenko, ulitsa Televidenia, 19, korpus 3, kv. 160, both of Moscow; Oleg Yakovlevich Gerasimov, ulitsa Gorkogo, 10a, kv. 46, Kalinin; Semen Grigorievich Lyandres, ulitsa Vokzalnaya, 5, kv. 4, Kalinin; Jury Borisovich Zuev, prospekt Pobedy, 74, kv. 7, Kalinin; Boris Alexandrovich Evdokimov, ulitsa Gvardeiskaya, 10a, kv. 66, Kalinin; July Alexandrovich Matveev, prospekt Pobedy, 74, kv. 35, Kalinin, all of U.S.S.R.

[22] Filed: Dec. 24, 1975

[21] Appl. No.: 643,944

[30] Foreign Application Priority Data

Dec. 30, 1974 U.S.S.R. .......................... 2090351

[52] U.S. Cl. ................................ 106/290; 106/87; 106/309
[51] Int. Cl.$^2$ .................... C04B 31/18; C09C 1/62
[58] Field of Search ............... 106/290, 309, 85, 87

[56] References Cited

UNITED STATES PATENTS

| | | | |
|---|---|---|---|
| 2,361,059 | 10/1944 | Robertson | 106/309 |
| 2,898,220 | 8/1959 | Ulfstedt et al. | 106/87 |
| 3,135,474 | 6/1964 | Schold | 106/309 |
| 3,551,174 | 12/1970 | Hauskas et al. | 106/87 |

*Primary Examiner*—J. Poer
*Attorney, Agent, or Firm*—Robert E. Burns; Emmanuel J. Lobato; Bruce L. Adams

[57] ABSTRACT

The invention relates to a process for the preparation of a concentrate or starting mixture containing pigments, blowing agents or mixtures thereof, for making construction elements, which need uniform distribution wherein an aqueous suspension of a pigment and/or blowing agent containing a surfactant is combined with a plurality of ferromagnetic bodies in a rotating electromagnetic field to cause stirring of the suspension.

The resultant starting concentrate mixture may then be successfully used in making colored silica brick, various colored concretes, as well as for preparing cellular concrete which is widely used in civil engineering and industrial building by adding the proper amount of the concentrate to the raw materials for the concrete or bricks.

4 Claims, No Drawings

PROCESS FOR THE PREPARATION OF STARTING MIXTURE FOR MAKING CONSTRUCTION ELEMENTS

The invention relates to processes for the preparation of starting mixtures or concentrate pigments and/or blowing agents to be used mainly for making constructional elements, such as colored silica brick, various colored concretes, as well as cellular concreate which is widely used in civil engineering and industrial building.

At present, there are widely known processes for the preparation of such starting mixtures to be used in making various constructional elements.

Among those processes, known in the art is a process for the preparation of a starting mixture pigment for making colored silica brick and bulk-colored concrete.

Known in the art is a process for the preparation of a colored starting mixture, wherein a dyeing pigment is preliminarily mixed with water and a surfactant in stirrer, such as a propeller stirrer. Then the resultant colored aqueous suspension is fed into a ball mill or vibration mill to be comminuted by the wet method with quartz sand for preparing colored sand sludge.

Subsequently, the colored sand sludge is batched and fed into a mixer with the addition of a finely comminuted mineral binder such as clay or concrete and a filler, such as quartz sand.

The starting mixture, which is thus prepared, is thus prepared, is fed for further processing.

The further processing comprises, for colored silica starting mixture, quenching in a reactor, stirring with additional wetting in a stirrer, molding in presses for making articles and hydrothermal treatment with steam.

For colored concrete mix, the further processing comprises only molding and hydrothermal treatment with steam.

With the above-described process the drying power of pigment is not completely utilized, especially when high-grade pigments in the form of finely comminuted powders are used. This results in an overconsumption of pigment, non-uniform dyeing and a higher cost of the elements produced.

It is also known to prepare a cellular concrete mix, wherein aluminium powder is used as blowing a agent.

Prior to the employment of aluminium powder as a blowing agent, it is subjected to a pretreatment comprising mixing with water and a surfactant in a propeller stirrer. Then the resultant aqueous suspension of aluminium powder is batched in accordance with a specified proportioning and fed into a stirrer, which is preliminarily loaded with other components of the cellular concrete mix, the components are stirred, and the resultant cellular concrete mix is then poured into molds for expansion, setting, hardening, cutting to predetermined sizes and hydrothermal treatment with steam.

Imperfections in the above-described process for the preparation of an aqueous suspension of aluminium powder result in non-homogeneity thereof due to the presence of aggregative formations and foamy inclusions containing non-wetted particles of aluminium powder, which finally results in overconsumption of aluminium and making finished articles having non-uniform structure.

It is also known to additionally subject aqueous suspensions of aluminium powder to ultrasonic treatment for 10 minutes under heating at 35°–85°C prior to the feeding thereof to a stirrer.

This process is deficient in that the suspension is processed in batches in small containers provided with magnetostrictors so that accurate and continuous implementation of the manufacturing process of making cellular concreate starting mixtures is impossible.

Special heaters and additional power consumption are required for heating the suspension. The container for ultrasonic treatment need be cleaned at regular intervals, which results in a considerable excessive consumption of aluminium powder which is washed off with waste water.

The main object of the invention is to provide a process for the preparation of a starting mixture for making constructional elements which enables maximum reduction of consumption of starting materials.

Another object of the invention is to provide a process for the preparation of a starting concentrate mixture which allows for obtaining constructional elements having a high degree of uniformity of bulk coloring and more uniform structure.

And finally, still another object of the invention is to provide a process for the preparation of a starting mixture to be used in making constructional elements having improved physical and mechanical properties.

These and other objects are accomplished by using a an aqueous suspension of a pigment or blowing agent and an aqueous suspension containing a surfactant and mixing them together for preparing a starting mixture, wherein, according to the invention, the aqueous suspensions, are processed with a plurality of ferromagnetic bodies in a rotating electromagnetic field.

In an alternative embodiment, the aqueous suspension containing a surfactant is used with a pigment, and the susbsequent processing with the ferromagnetic bodies in a rotating electromagnetic field is effected for 3 or 4 hours under heating to at least 30°C.

The aqueous suspension maybe mixed with quartz sand after the processing with the ferromagnetic bodies.

In another embodiment, the aqueous suspension containing a surfactant is used with a blowing agent, and is subsequently processed with ferromagnetic bodies in a rotating electromagnetic field at a rate of from 14 to 16 l/min in a chamber containing from 0.48 to 0.52 g/cm$^3$ of ferromagnetic bodies.

The essence of the invention is as follows.

An aqueous suspension of a pigment or an aqueous suspension of aluminium powder is fed through a chamber with a rotating electromagnetic field established therewithin. Rotational speed of the electromagnetic field is from 280 to 314 rad/s. A working member for processing the suspension comprises ferromagnetic bodies of a certain shape and size. Each ferromagnetic body is magnetized under the effect of the rotating electromagnetic field thus becoming a magnet so that the body passesses its own magnetic. Under the effect of the rotating magnetic field, the body rotates together therewith and tends to turn so as to become oriented along the magnetic lines of force which, in turn, change their direction at a frequency of the alternating current.

In addition, the ferromagnetic bodies meet and hit against one another and against the chamber walls and other particles of various substances (pigment, aluminium powder) introduced into the chamber. Thus, the bodies perform an intensive work for comminuting and stirring aqueous suspensions of a pigment or blowing agent. The presence of a surfactant contributes to faster and better wetting of each particle of a pigment of aluminium powder with water. It should be noted that less energy is consumed for comminution of particles. The resultant suspension exhibits stable antisettling properties, which is very important for maintaining a predetermined number of pigment or aluminium powder particles per unit volume of the aqueous suspension, the shape, number and size of ferromagnetic bodies being selected for each specific application depending on desired results.

Depending on what is desired - processing of suspension, comminution of particles therein or stirring thereof, combination of both, various processing conditions are selected in different, proportions.

The invention will be better understood from the following examples of specific embodiments thereof.

EXAMPLE 1

Water, phthalocyanine blue or phthalocyanine green and a surfactant were batched in a ration of 50.00:1.00:0.28 and fed to a 1.2m$^3$ batch stirrer. Then the suspensions thus stirred, was pumped for two hours through a chamber with a rotating electromagnetic field at 314 rad/s (3000 rpm) saturated with ferromagnetic bodies in an amount of 0.48 g/cm$^3$ which comprised cylinders 1.2–1.5 mm in diameter and 15–18 mm long moving at random. Magnetic induction at the central portion of the chamber was at least 0.138 Tesla.

During the processing, the suspension was heated at to least 30°C by the energy of the electromagnetic field.

The processing of the suspension for less than 2 hours cannot provide for complete utilization of the dyeing power of a pigment, while the processing for more than 2 hours results in useless overconsumption of electric energy because the initial specific surface of the phthalocyanine dyes is from $8.10^7$ to $10.10^7$ m$^2$g.

Heating of the coloring suspension to at least 30°C enables more complete utilization of hydrophilic properties of a surfactant and accelerates the destruction of aggregates. In addition, the viscosity of the suspension is lowered.

Further, the resultant suspension was then pumped into a hopper over a ball mill and then batched for grinding together with quartz sand. The resultant colored sludge was fed to a batching section for the preparation of a colored starting mixture with subsequent processing thereof for making constructional elements in accordance with a conventional manufacturing technique.

EXAMPLE 2

Water, iron minium and a surfactant were batched in a ratio of 2:1:0.55 and fed to a stirrer for preliminary stirring with subsequent treatment by the method described in Example 1. The ferromagnetic bodies used in this Example were 1.8–2.0 mm in diameter and 18–20 mm long. The processing of the suspension in a rotating electromagnetic field was effected for 3 hours since iron minium has a smaller specific surface than the phthalocyanine dyes, namely, of from $2.10^7$ to $4.10^7$ m$^2$/g. The processing for less than 3 hours is insufficient since the specific surface of iron minium should be increased up to $6.10^7$ to $4.10^7$ m$^2$/g. In spite of the fact that iron minium is well wetted with water, a surfactant was added to ensure better comminution and to stabilize the suspension against settling of the minium particles.

The heating to at least 30°C contributes to the destruction of aggregates, that is, to a more uniform distribution of the pigment in water. A longer processing of the suspension is inexpedient due to unjustifed electric energy consumption.

EXAMPLE 3

Water, aluminium powder and a surfactant were batched in ratio of 11.00:1.00:0.5 and fed to a propeller stirrer for mixing, and then they were fed for additional processing to a chamber with a rotating electromagnetic field saturated with ferromagnetic bodies 1.2–1.5 mm in diameter and 18–20 mm long at a rate of 16 1/min. The amount of ferromagnetic bodies used was 0.50 g/cm$^3$ of the working volume of the chamber. The processing of the aqueous solution of aluminium powder at a rate more or less than 16 1/min results in a longer processing time, overconsumption of electric energy, increased volume of foam and, hence, in a reduced gas-forming power of the suspension.

Subsequently, the resultant aqueous suspension of aluminium powder was batched into a batch blade stirrer which was preliminarily loaded with the other components of a cellular concrete mix.

After the stirring, the cellular concrete mix was fed for further processing for making finished articles in accordance with a conventional manufacturing technique.

EXAMPLE 4

Water, a dye (such as phthalocyanine blue, phthalocyanine green, minium) and a surfactant were batched in a ratio dictated by technological calculations and depending on the moisture content of starting components of the starting mixture and amount of mineral binder the used, and fed into a stirrer of of any appropriate type. Then the suspension was pumped for 2.5 hours through a chamber with an electromagnetic field rotating at 2500–3000 rpm saturated with ferromagnetic bodies in an amount of 0.52 g/cm$^3$ of 1.2–1.5 mm in diameter and 15–18 mm long which performed random motion. Magnetic induction at the central portion of the chamber was at least 0.138 Tesla.

The suspension was processed as described in Example 1, but further it was fed directly into the batching section for the preparation of a silica or concrete mix.

What is claimed is:

1. The process for the preparation of starting concentrate mixture of pigments and/or blowing agent used in the manufacture of construction elements which comprises the steps of a) suspending said pigments and/or blowing agents in aqueous media containing surfactants,
   b. introducing into said suspension a plurality of ferromagnetic bodies
   c. subjecting said suspension containing said bodies to a rotating electromagnetic field to effect wetting and uniform distribution of said pigments and/or blowing agent in said resultant starting concentrate mixtures for incorporation in mixes for construction elements.

2. The process as claimed 1, wherein the aqueous suspension containing surfactant, pigment, and the ferromagnetic bodies in the rotating electromagnetic field is effected for 2 or 3 hours while being heated to at least 30°C.

3. The process as claimed in claim 1, wherein said aqueous suspension, after the processing thereof with ferromagnetic bodies in a rotating electromagnetic field, is mixed with quartz sand to provide a solid state concentrate mixture.

4. The process as claimed in claim 1, wherein the aqueous suspension containing a surfactant blowing agent, is subjected to said rotating electromagnetic field at a rate of from 14 to 16 l/min. in a chamber containing said ferromagnetic bodies in an amount from 0.48 to 0.52 g/cm$^3$.

* * * * *